United States Patent [19]
Su

[11] Patent Number: 6,082,249
[45] Date of Patent: Jul. 4, 2000

[54] MULTI-PURPOSE COOKER

[76] Inventor: Yung-Sen Su, P.O. Box 82-144, Taipei, Taiwan

[21] Appl. No.: 09/467,791

[22] Filed: Dec. 20, 1999

[51] Int. Cl.[7] .............................. A47J 37/00; A47J 37/08; A47J 37/12

[52] U.S. Cl. ................................ 99/340; 99/400; 99/422; 99/425; 99/446; 99/448; 99/450

[58] Field of Search .............................. 99/330, 339, 340, 99/372, 375, 400, 401, 422–425, 444–450; 219/401, 400, 438, 472

[56] References Cited

U.S. PATENT DOCUMENTS

| | | | |
|---|---|---|---|
| 1,750,596 | 3/1930 | Hois | 126/369 |
| 1,988,920 | 4/1935 | Bremer | 99/339 |
| 2,466,349 | 4/1949 | Andersen | 99/340 |
| 3,577,908 | 5/1971 | Burg | 99/340 |
| 4,649,811 | 3/1987 | Manganese | 99/340 X |
| 4,702,160 | 10/1987 | Manganese | 126/369 X |
| 4,889,972 | 12/1989 | Chang | 99/339 |
| 5,176,067 | 1/1993 | Higgins | 99/340 |
| 5,235,904 | 8/1993 | Ludena | 99/340 X |
| 5,275,094 | 1/1994 | Naft | 99/448 X |
| 5,287,798 | 2/1994 | Takeda | 99/417 X |
| 5,349,898 | 9/1994 | Cheung | 126/369 X |
| 5,552,577 | 9/1996 | Su | 99/340 X |

*Primary Examiner*—Timothy Simone
*Attorney, Agent, or Firm*—A & J

[57] ABSTRACT

A multi-purpose cooker includes a base having a circular top formed with a plurality of equidistant holes, a heating seat having a bottom formed with a plurality of downwardly extending pins engageable with the holes, a heating member mounted within the heating seat and provided with a switch and a control button on an outer side of the heating seat, a frying pan configured to be mounted on the heating seat and provided with a plurality of slots for passage of oil so as to prevent food from sticking the frying pan, a barbecue grill provided with a plurality of supporting legs adapted to be arranged on the heating seat for roasting food, a circular tray having an annular recess and a central portion formed with a projection, a pot having a bottom formed with a cavity configured to engage with the projection, and a plurality of condiment trays configured to be fitted in the annular recess of the circular tray.

1 Claim, 11 Drawing Sheets

MULTI-PURPOSE COOKER

BACKGROUND OF THE INVENTION

1. Field of the Invention

This invention is related to a multi-purpose cooker and in particular to one which can be used for preparing different kinds of dishes.

2. Description of the Prior Art

It has been found that the conventional cooker sold in the marketplace has only one purpose. As such, it is necessary for a user to prepare a number of pans and trays in order to prepare different kinds of dishes thereby wasting a lot of money and furthermore, causing much inconvenience in use.

Therefore, it is an object of the present invention to provide a multi-purpose cooker which may obviate and mitigate the above-mentioned drawbacks.

SUMMARY OF THE INVENTION

This invention is related to a multi-purpose cooker.

It is the primary object of the present invention to provide a multi-purpose cooker which can be used for preparing different dishes.

It is another object of the present invention to provide a multi-purpose cooker which is easy to clean and convenient to use It is still another object of the present invention to provide a multi-purpose cooker which is compact in size.

It is still another object of the present invention to provide a multi-purpose cooker which is sanitary in use.

It is a further object of the present invention to provide a multi-purpose cooker which is simple in construction and low in cost.

According to a preferred embodiment of the present invention, a multi-purpose cooker includes a base having a circular top formed with a plurality of equidistant holes, a heating seat having a bottom formed with a plurality of downwardly extending pins engageable with the holes, a heating member mounted within the heating seat and provided with a switch and a control button on an outer side of the heating seat, a frying pan configured to be mounted on the heating seat and provided with a plurality of slots for passage of oil so as to prevent food from sticking the frying pan, a barbecue grill provided with a plurality of supporting legs adapted to be arranged on the heating seat for roasting food, a circular tray having an annular recess and a central portion formed with a projection, a pot having a bottom formed with a cavity configured to engage with the projection, and a plurality of condiment trays configured to be fitted in the annular recess of the circular tray.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
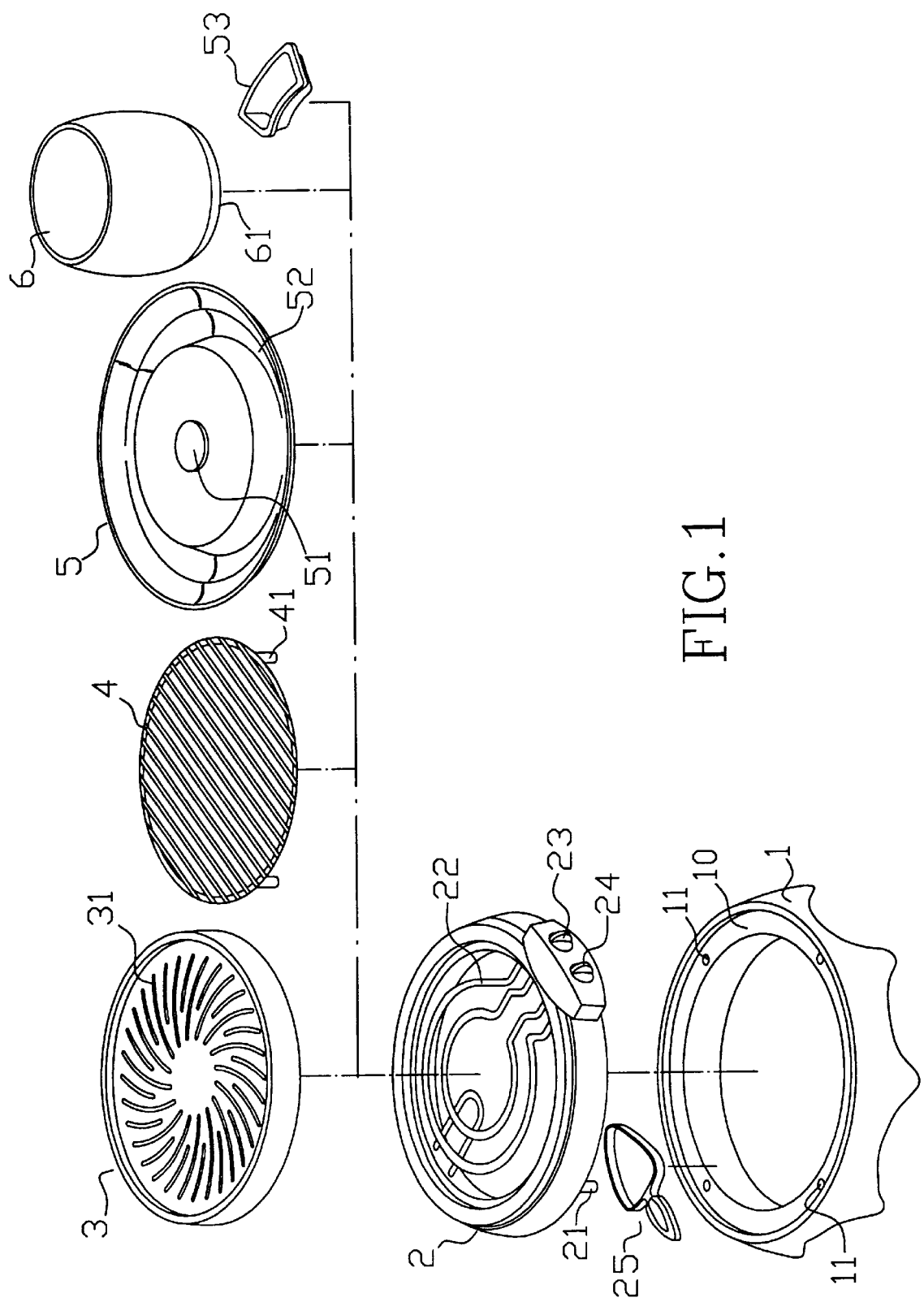
FIG. 1 is an exploded view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIG. 1, the multi-purpose cooker according to the present invention generally comprises a base 1, a heating seat 2, a frying pan 3, a barbebue grill 4, a circular tray 5, a pot 6, a condiment tray 53 and a baking plate 25.

The base 1 has a flange at the top formed with a plurality of equidistant holes 11. The heating seat 2 is provided with a plurality of pins 21 extending downwardly from the bottom thereof and configured to engage with the holes 11, so that the heating seat 2 can be arranged on the base 1 and moved up down with respect to the base 1 to form a space 26 (see FIG. 3) for receiving the baking plate 25. A heating member 22 is mounted within the heating seat 2 and controlled by a switch 23 and a control button 24 mounted on the outer side of the heating seat 2.

The frying pan 3 is adapted to be mounted on the heating seat 2 and provided thereon with a plurality of slots 31 for the passage of oil so as to prevent food from sticking the frying pan 3.

The barbecue grill 4 is provided with a plurality of supporting legs 41 at the bottom and adapted to be arranged on the heating seat 2 for roasting food.

Figure 11:
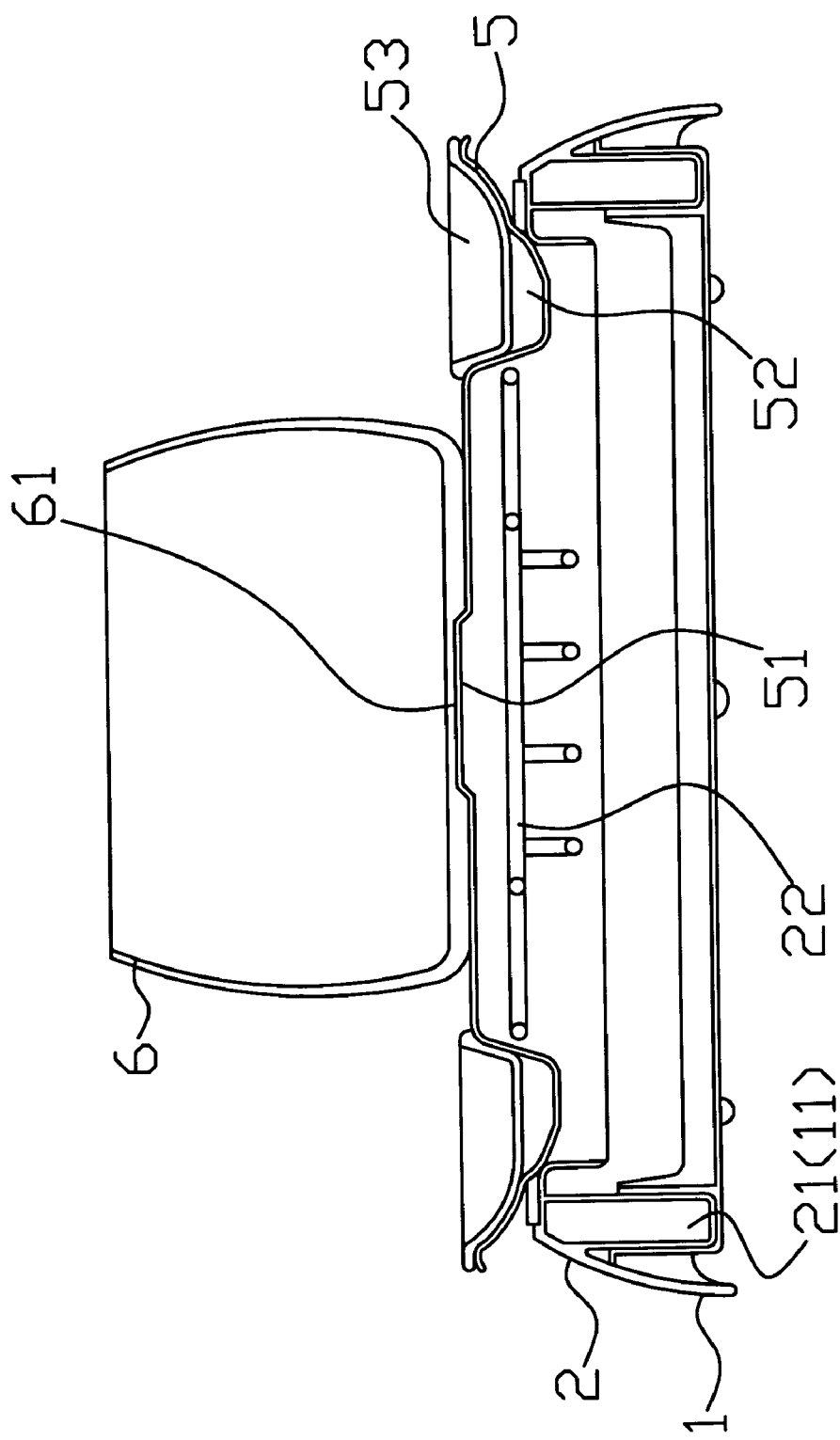
FIG. 11 is a sectional view of FIG. 6.

The circular tray 5 is formed with a projection 51 at the center and an annular recess 52, wherein the projection 51 is configured to receive a cavity 61 (see FIG. 11) at the center of the bottom of the pot 6 and the annular recess 52 is used for cooking, frying and baking and configured to receive a condiment tray 53 for giving flavour and relish to food.

Figure 2:
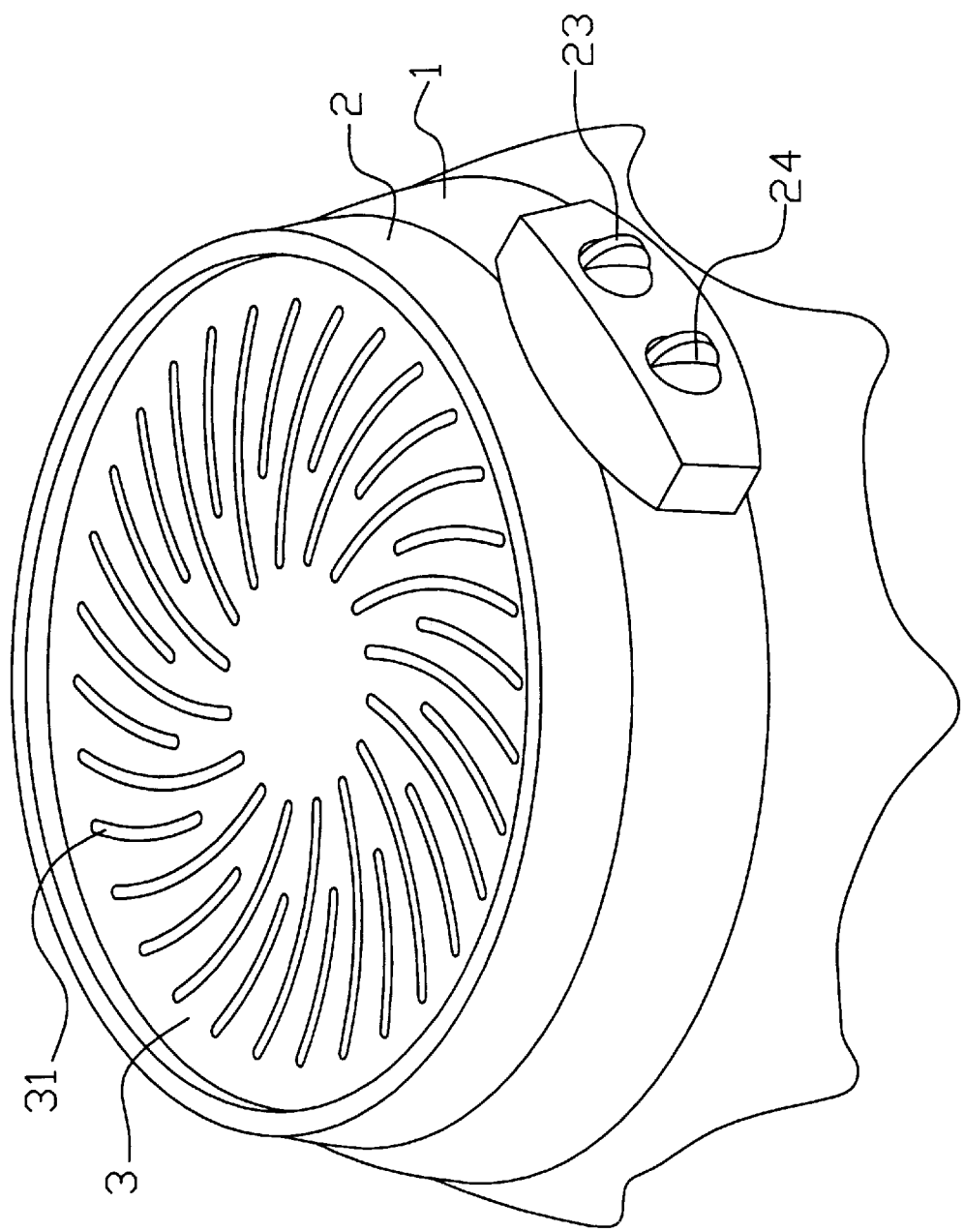
FIG. 2 illustrates how the base, heating seat and the frying pan are assembled.
Figure 7:
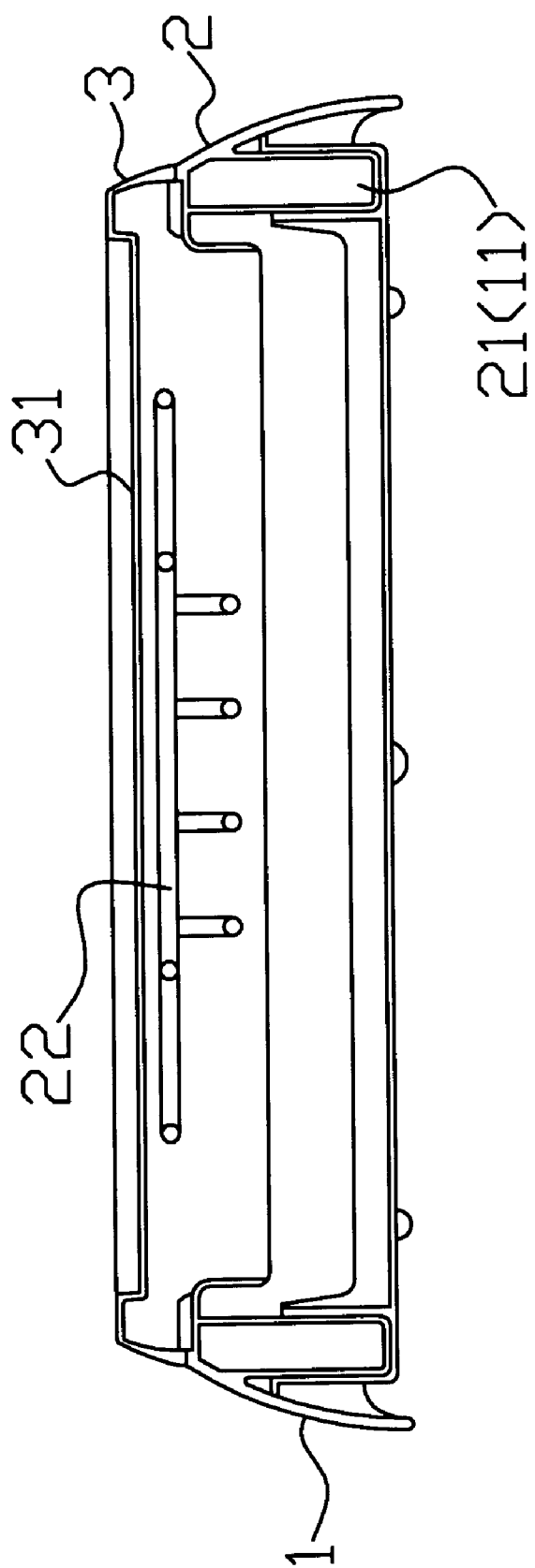
FIG. 7 is a sectional view of FIG. 2.

Referring to FIGS. 1, 2 and 7, the heating seat 2 is arranged on the base 1 with the pins 21 of the former extending into the holes 11 of the latter. The frying pan 3 is disposed on the heating seat 2 so that the heating member 22 is positioned right under the frying pan 3. As the frying pan 3 is formed with a plurality of slots 31 for preventing food from sticking thereon. The switch 23 and the control button 24 on the outer side of the heating base 2 are used for controlling magnitude of the fire.

Figure 3:
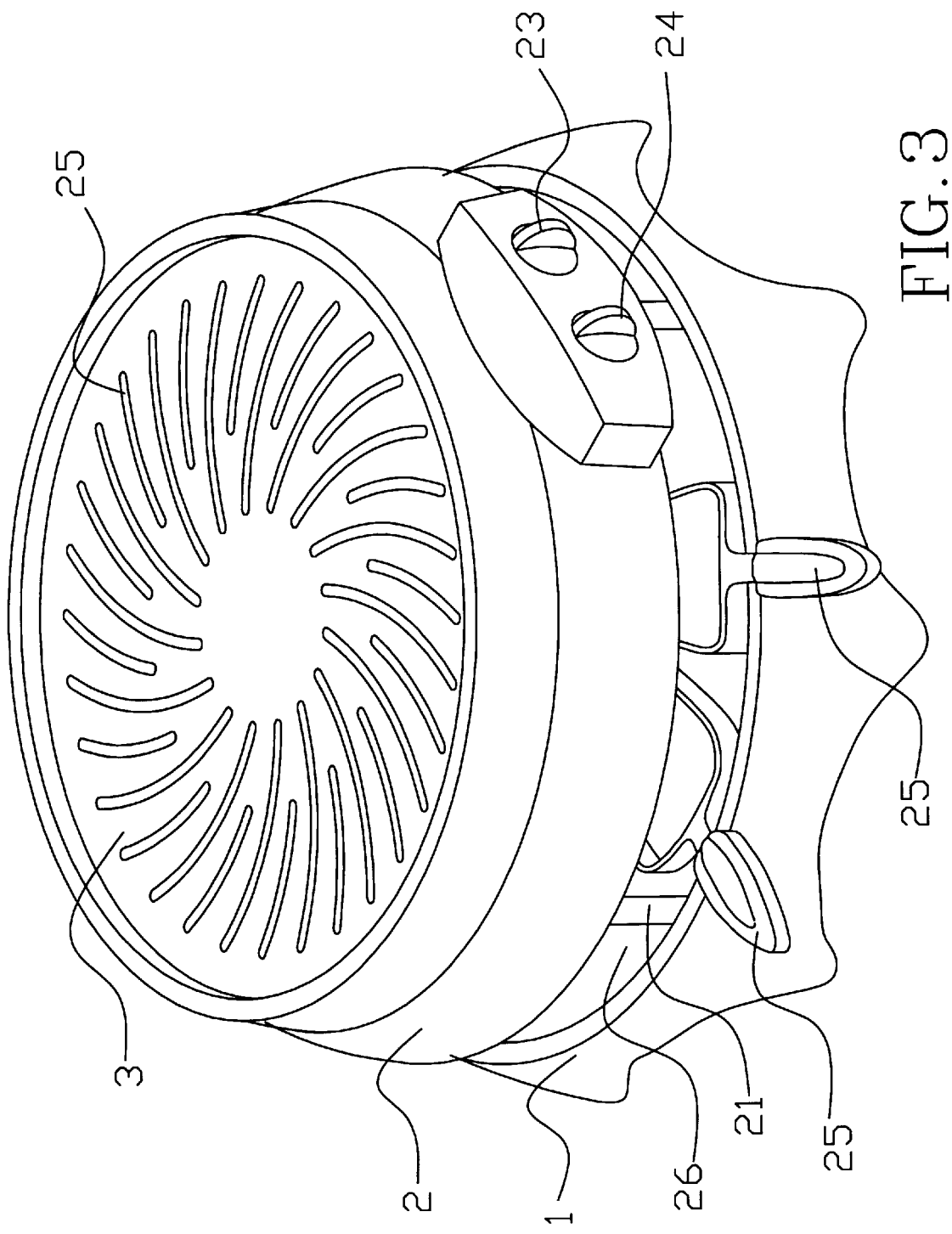
FIG. 3 illustrates how the base, heating seat, frying pan and baking pans are assembled.
Figure 8:
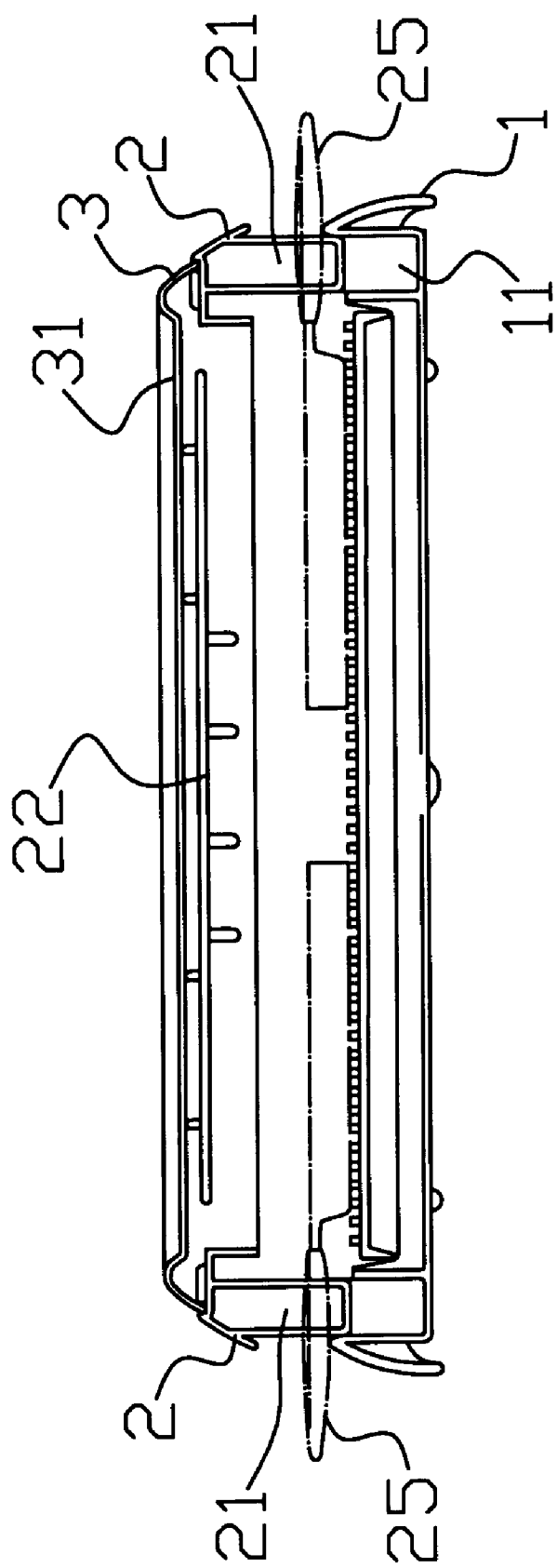
FIG. 8 is a sectional view of FIG. 3.

Referring to FIGS. 3 and 8, the heating seat 2 is first moved upwardly out of the base 1 and then disposed on the base 1 with the pins 21 standing on the flange 10 of the base 1 thereby providing a space 26 for receiving baking trays for baking oysters, shells or the like.

Figure 4:
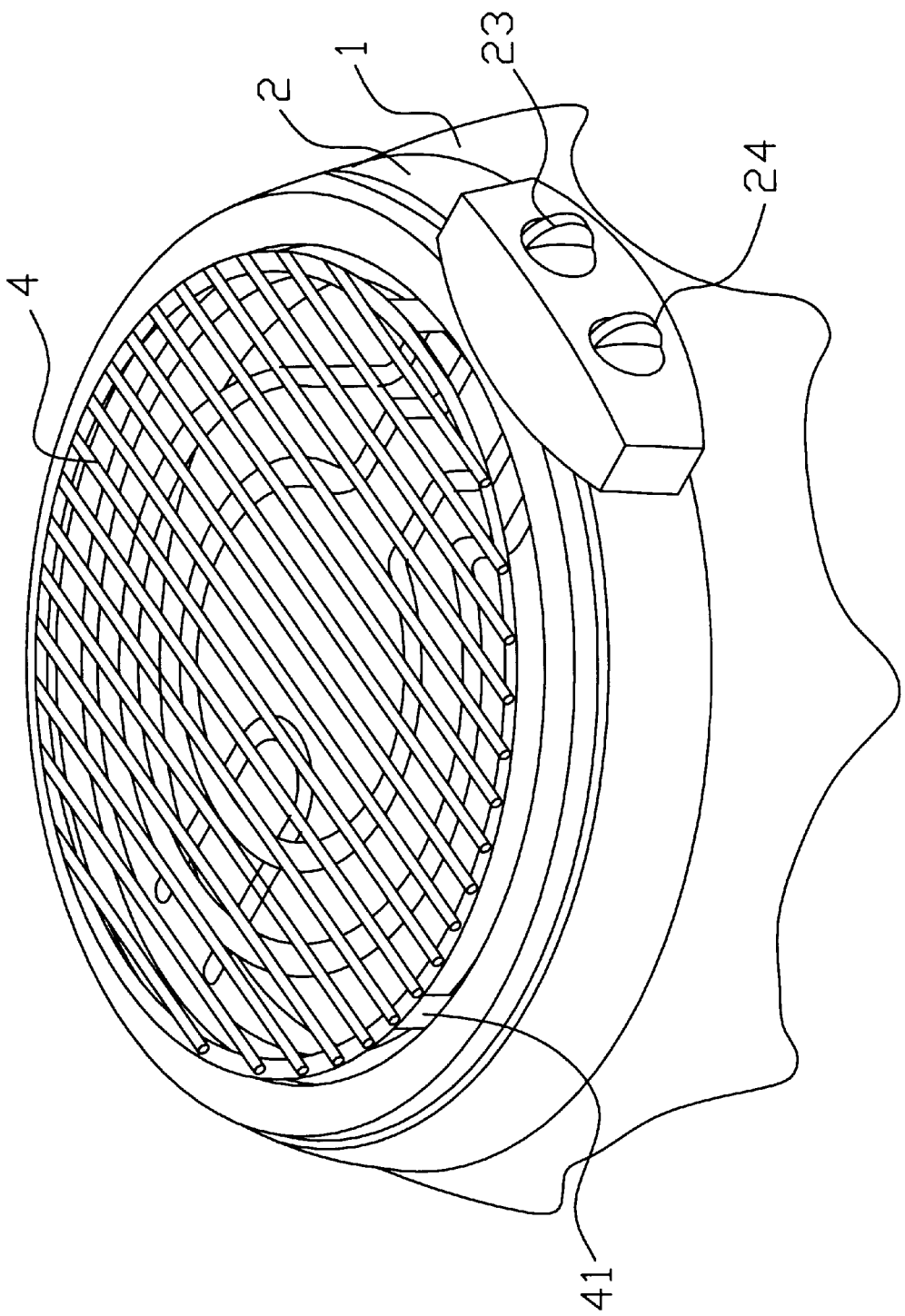
FIG. 4 illustrates how the base, heating seat and barbecue grill are assembled.
Figure 9:
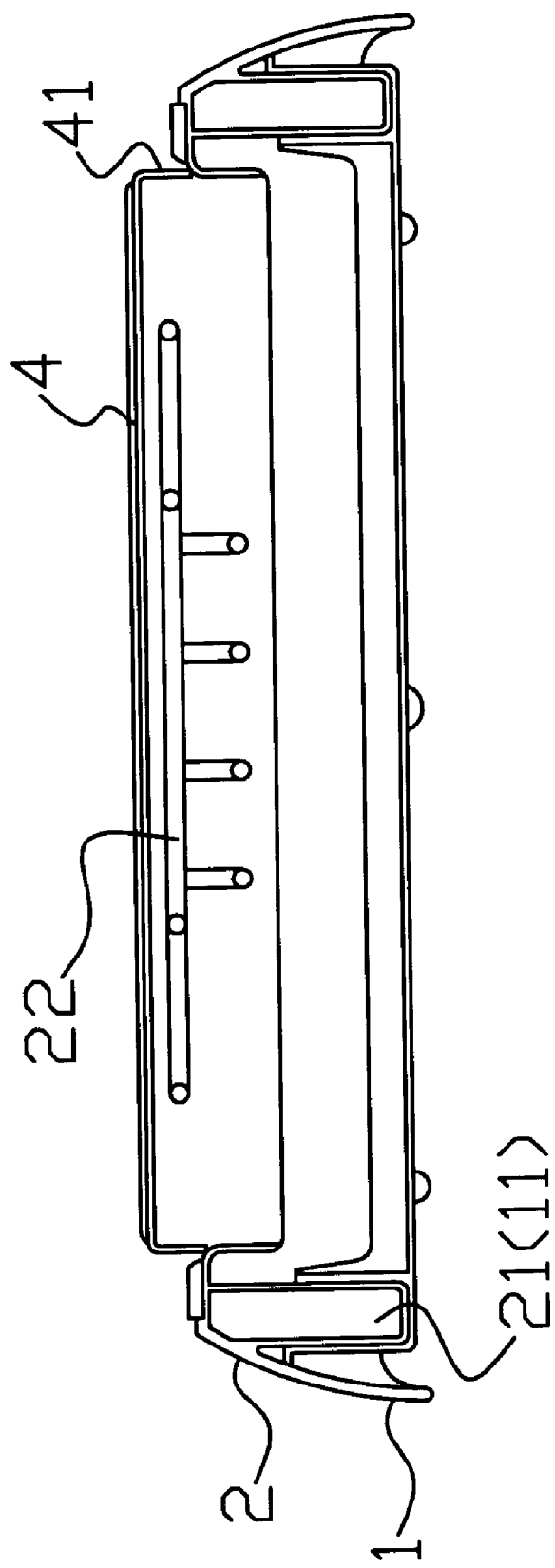
FIG. 9 is a sectional view of FIG. 4.

Referring FIGS. 4 and 9, the heating seat 2 is disposed on the base 1, with the pins 21 extending downwardly into the holes 11 of the base 1 and the barbecue grill 4 is arranged on the heating seat 2, so that the barbecue grill 4 is located right above the heating member 4 for roasting foods. The switch 23 and the control button 24 on the outer side of the heating base 2 are used for controlling magnitude of the fire.

Figure 5:
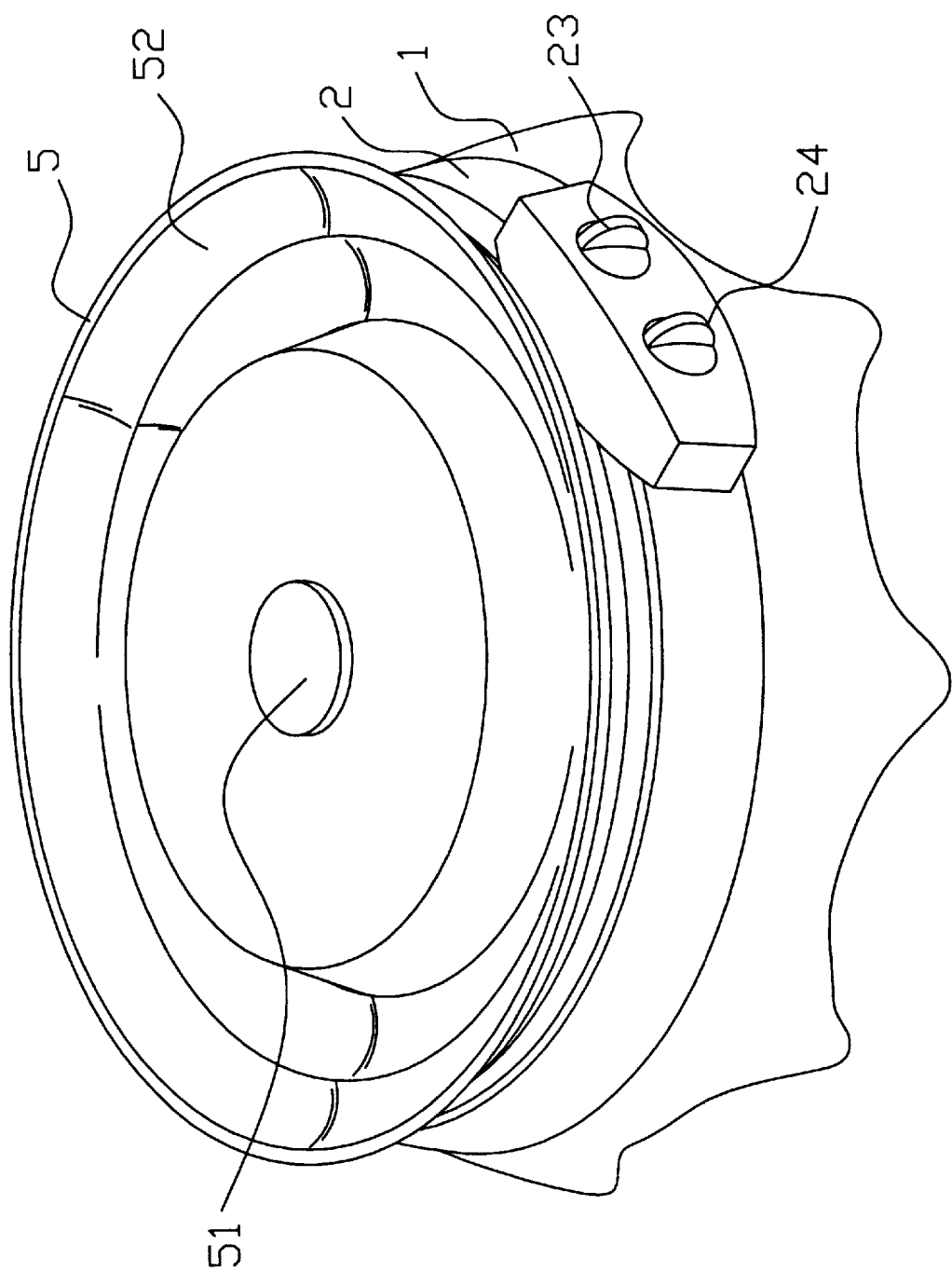
FIG. 5 illustrates how the base, heating seat and circular tray are assembled.
Figure 6:
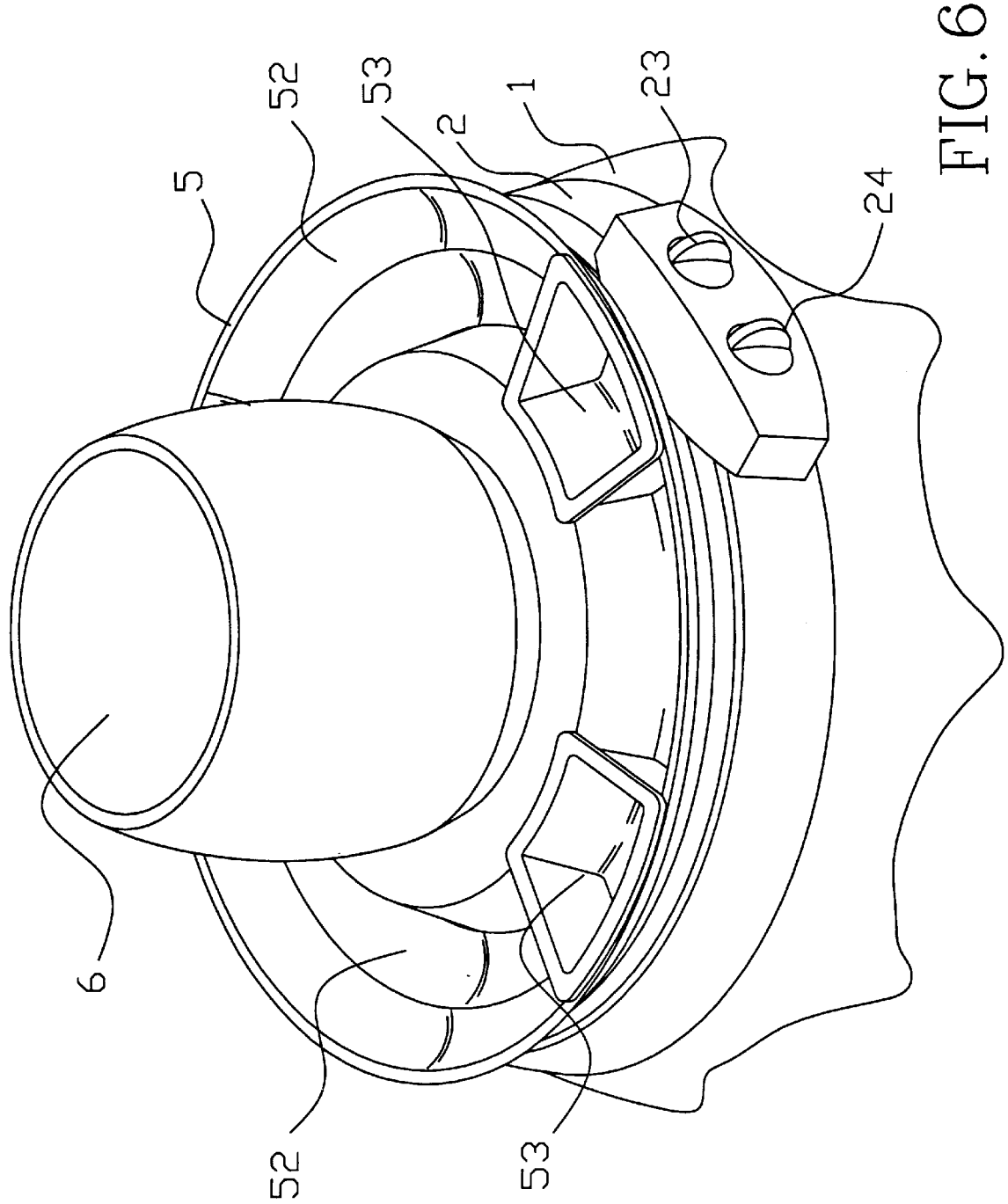
FIG. 6 illustrates how the base, heating seat, circular tray, pot and condiment trays are assembled.
Figure 10:
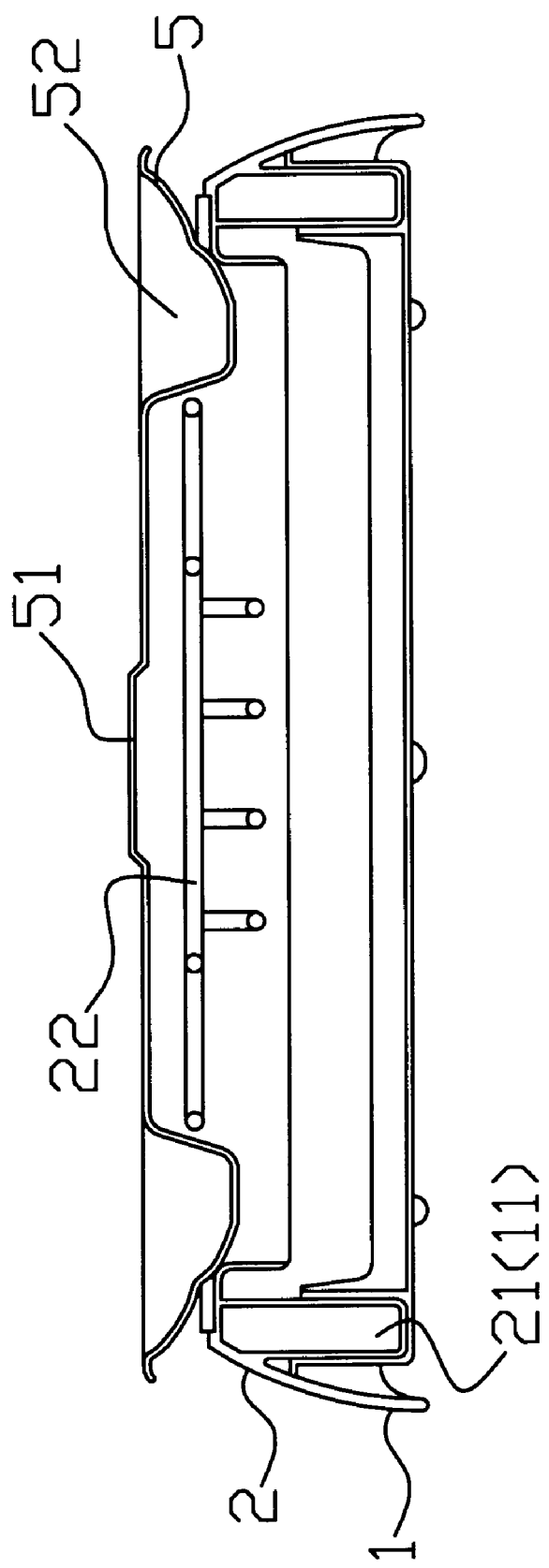
FIG. 10 is a sectional view of FIG. 5.

FIGS. 5 and 10 illustrate the engagement between the base 1, the heating seat 2 and the circular tray 5. As shown, the heating seat 2 is mounted on the base 1 with the pins 21 of the former extending downwardly into the holes 11 of the latter. The frying pan 3 is disposed on the heating seat 2 and has slots 31 for preventing food from sticking thereon. The projection 51 at the center of the frying pan 3

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A multi-purpose cooker comprising:

a base having a circular top formed with a plurality of equidistant holes;

a heating seat having a bottom formed with a plurality of downwardly extending pins engageable with said holes;

a heating member mounted within said heating seat and provided with a switch and a control button on an outer side of said heating seat;

a frying pan configured to be mounted on said heating seat and provided with a plurality of slots for passage of oil so as to prevent food from sticking said frying pan;

a barbecue grill provided with a plurality of supporting legs adapted to be arranged on said heating seat for roasting food;

a circular tray having an annular recess and a central portion formed with a projection;

a pot having a bottom formed with a cavity configured to engage with said projection; and a plurality of condiment trays configured to be fitted in said annular recess of said circular tray.

* * * * *